April 21, 1931. F. HERZFELD-HOFFMANN 1,801,920
OPTICAL DEVICE
Filed Jan. 28, 1928
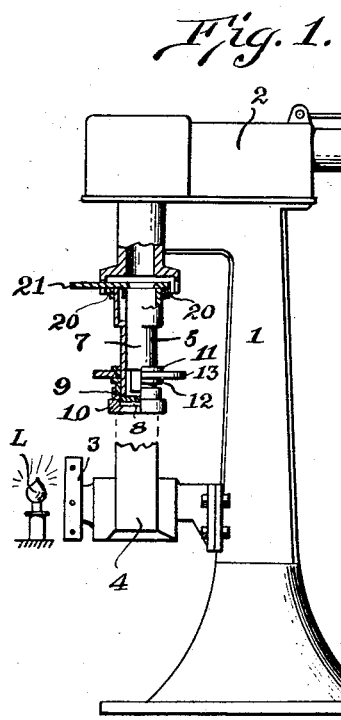
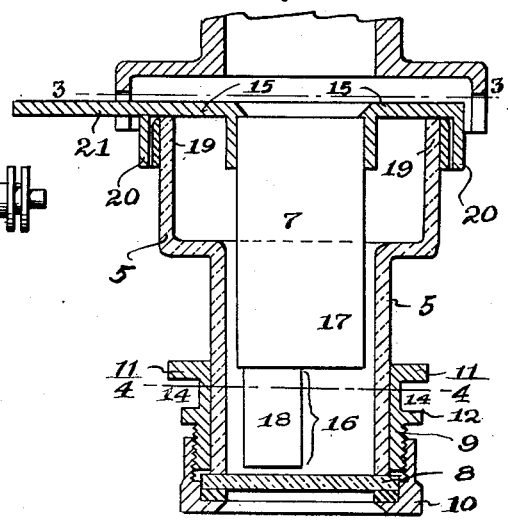
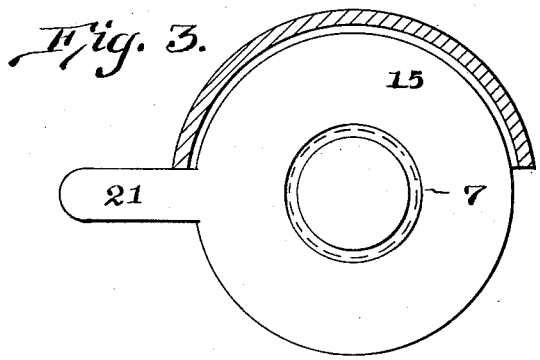
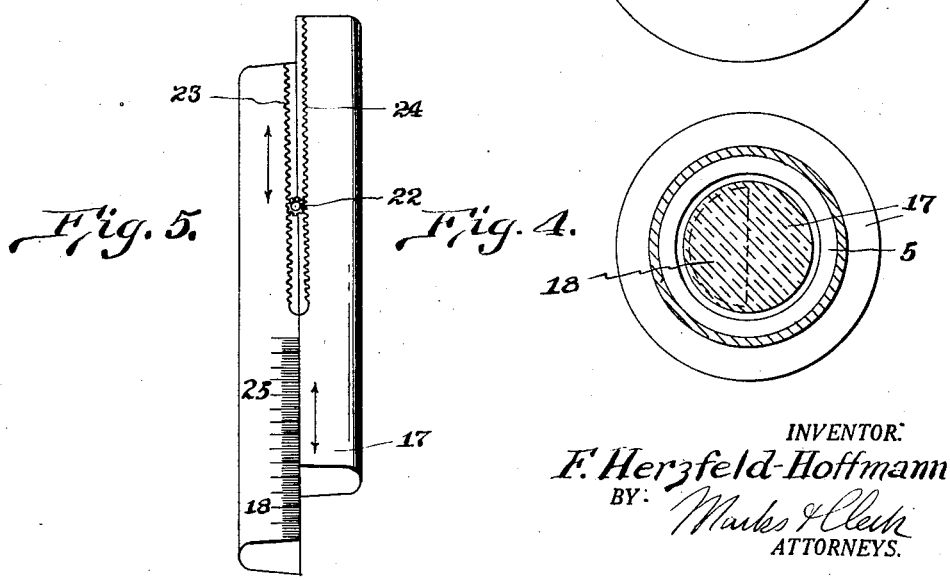
INVENTOR:
F. Herzfeld-Hoffmann
BY:
ATTORNEYS.

Patented Apr. 21, 1931

1,801,920

UNITED STATES PATENT OFFICE

FREDA HERZFELD-HOFFMANN, OF BERLIN, GERMANY

OPTICAL DEVICE

Application filed January 28, 1928, Serial No. 250,265, and in Germany January 31, 1927.

The invention relates to measurement of optical properties of liquids and gases, such as colour, rotatory power, turbidity, etc.

Measurements of this kind have hitherto been frequently made for scientific purposes. The best results in such tests were obtained by applying the following method: A beam of light penetrates a column of the substance under investigation. A second equivalent beam of light from the same source runs through a longer column of the same substance. Whilst penetrating this, the light changes its properties through the influence of the substance under investigation. A coloured liquid, for example, absorbs light of some wave-lengths whilst other wave-lengths pass through unweakened. Sugar juice causes rotation of the plane of polarization. Turbid liquids cause absorption of light in most wave-lengths etc. This variation in the properties of the light is stronger in a beam of light, which has passed the longer column than in a beam which has passed the shorter one. The measurement is carried out by comparing the amount of absorption or of rotation of the plane of polarization etc., in the two beams of light by means of any suitable optical device, such as photometer, spectrophotometer, polarization-apparatus, nephilometer and the like.

For the best results with this method it is necessary to transfuse the two columns with beams of light of exactly the same intensity, and further to have the exact difference between the length of the two columns.

The present invention consists of an improvement of the device for carrying out the measurements in this direction, and at the same time in simplifying the device, which hitherto was too complicated for industrial use.

In regard to the device, the two different columns through which the two beams of light pass were hitherto formed either by two tubes of different length, filled with the substance under investigation, or by plunging two transparent bodies to different depths into the substance being investigated. In both cases there exists a considerable distance between the two columns and it is therefore very difficult to succeed in lighting the two columns with exactly the same intensity of light, as generally a source of light gives varying intensity.

The present invention consists in forming the two different columns of the subsance under investigation by means of a single body consisting of glass or of any other transparent material. This body is in form a step, the elevation of the step forming the well-defined difference of the length of the two columns. The two columns formed by this plunger lie perfectly close side by side. Generally a measuring-apparatus is provided with several of these plunging bodies, each having a different elevation of the step. The elevation of the step can be as high as desired for any special purpose; it is possible on the other hand to provide an absolutely fixed elevation down to only 1 mm. or less. Different elevations are necessary for the investigation of different substances. The colour of a dark liquid for instance has to be measured with a small step of perhaps only a few millimetres elevation, whilst for a light liquid a difference of several centimetres in the length of the columns might be necessary to give an easy measurable difference of the quanities of absorption in the two beams of light. Usually, elevations from 5 cm. to 1 mm. will suffice in any investigation.

It is possible, too, to arrange the body so, that the elevation of the step is variably adjustable, so that with one body various elevations of the step and various differences of length of the two columns can be adjusted.

In regard to the method of measurement, this is carried out as follows. A cup with transparent bottom is filled with the substance under investigation. The plunger is plunged into the substance, forming the columns of different length in the above mentioned substance. Light enters the cup at its bottom and partly passes the longer, partly the shorter column of the substance under investigation. Both beams of light then enter the optical measuring-device, by means of which the different quantities of absorption etc. are examined in any of the known ways. If necessary the plunger can be immediately exchanged for another plunging body with a different step-elevation for further measurements.

After finishing the investigation of one substance, this is simply poured out of the cup. The cup is then cleaned and filled with a new substance. These manipulations can be carried out in considerably short time, whilst the filling and cleaning of the tubes used hitherto take a comparatively long time, thereby making it impossible to use the hitherto known methods of measuring of optical properties for many industrial uses.

For some measurements, for instance if the well-known photometer of König-Martens is used as optical device, it is necessary to substitute the two columns so that for a second measurement the longer column takes the place of the shorter one and vice versa. Improved means for simplifying this interchange are the object of the present invention too.

To enable others skilled in the art so fully to apprehend the underlying features hereof that they may embody the same in the various ways contemplated by this invention, drawings depicting a preferred typical construction have been annexed as a part of this disclosure and, in such drawings like characters of reference denote corresponding parts throughout all the views, of which:

Fig. 1 is a side elevation, partly in section of a photometer embodying the present invention. Fig. 2 is an enlarged sectional view of a portion of Fig. 1. Fig. 3 is a section on line 3—3 of Fig. 2. Fig. 4 is a section on line 4—4 of Fig. 2. Fig. 5 is a detailed view of a device for adjustment of the elevation of the step.

Referring more particularly to the drawings, the invention is disclosed in a preferred form as embodied in a photometer comprising a support 1, bearing the optical photometer equipment 2. The light from a light source L enters the apparatus through a window 3, being reflected upwards by means of a prism 4, passing through the cup 5 filled with the substance under investigation, into which the plunger 7 is plunged. The bottom of the cup 5 is formed by a disk 8 of glass, clamped to the cup by means of screw 9 and nut 10. The cup 5 is provided with flanges 11 and 12. The cup is held in the photometer by means of a shank 13, fitted into the space 14 between flanges 11 and 12. The cup has on its upper end an enlargement, which prevents the liquid from overflowing, when the plunger 7 is put into the liquid. The plunger is attached to cap 15 of the cup and has an elevation 16 of the step formed by the short part 17 and the long part 18. Plunger 7 is rotatable together with cap 15 on the upper end 19 of the cup 5 onto which fits rim 20 of cap 15, so that part 17 takes the place of part 18 and vice versa. A stop 21 prevents the cap and plunger from being rotated further than 180 degrees. Fig. 5 shows the two parts 17 and 18 of the plunger 7 being translatable to each other by means of a toothed wheel 22 fitting to racks 23 and 24. The length of the elevation can be read from scale 25.

From the foregoing it will be perceived that this invention provides improved means for ascertaining optical properties of liquids and gases. Only a single plunger is necessary to form two different columns of the substance. The columns lie perfectly close side by side, so that it is easy to transfuse them with beams of light of equal intensity. The elevation of the step can be fixed with perfect accuracy. At the same time the measurements can be carried out with remarkable simplicity and rapidity.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention, and therefore such adaptations should be, and are intended to be, comprehended within the meaning and range of equivalency of the following claims.

I claim:

1. Apparatus for ascertaining optical properties of liquids and gases consisting of a source of light, of an optical system directing beams of light into a cup with transparent bottom, of a cup which is filled with the substance under investigation, of a plunger in step form, which is plunged into the substance, and of an optical measuring device for ascertaining the change in the beams of light caused by the influence of the substance under investigation.

2. A device for ascertaining optical properties of liquids, having a single vessel for receiving a liquid, a single transparent plunger for immersion into said liquid, one side of said plunger projecting longitudinally relative to the other side, to form of said liquid two layers of varying length, and means for transmitting light through said layers and said plunger.

3. A device for ascertaining optical properties of liquids, having a single vessel for receiving a liquid, a single transparent plunger for immersion into said liquid, one side of said plunger projecting longitudinally relative to the other side to form of said liquid two layers of varying length, means for rotating said plunger to interchange said layers, and means for transmitting light through said layers and said plunger.

4. A device for ascertaining optical properties of liquids, having a single vessel for receiving the liquid, a single transparent plunger for immersion into said liquid, one side of said plunger projecting longitudinally relative to the other side, to form of said liquid two layers of varying length, means for rotating said plunger and said vessel to interchange said layers, and means for transmitting light through said layers and said plunger.

5. A device for ascertaining optical properties of liquids and gases, having a vessel for receiving the substance for investigation, a transparent plunger for immersion into said substance, parts of said plunger projecting longitudinally relative to other parts of said plunger, thereby forming of said substance layers of varying length, means for rotating said plunger to interchange said layers, and means for transmitting light through said layers and said plunger.

In testimony whereof I hereunto affix my signature.

FREDA HERZFELD-HOFFMANN.